(12) United States Patent
Naqvi

(10) Patent No.: US 10,701,165 B2
(45) Date of Patent: Jun. 30, 2020

(54) METHOD AND SYSTEM FOR USING DEVICE STATES AND USER PREFERENCES TO CREATE USER-FRIENDLY ENVIRONMENTS

(71) Applicant: Sensoriant, Inc., Cedar Knolls, NJ (US)

(72) Inventor: Shamim A. Naqvi, Morristown, NJ (US)

(73) Assignee: Sensoriant, Inc., Cedar Knolls, NJ (US)

(*) Notice: Subject to any disclaimer, the term of this patent is extended or adjusted under 35 U.S.C. 154(b) by 42 days.

(21) Appl. No.: 15/761,886

(22) PCT Filed: Sep. 23, 2016

(86) PCT No.: PCT/US2016/053319
§ 371 (c)(1),
(2) Date: Mar. 21, 2018

(87) PCT Pub. No.: WO2017/053707
PCT Pub. Date: Mar. 30, 2017

(65) Prior Publication Data
US 2018/0288176 A1    Oct. 4, 2018

Related U.S. Application Data

(60) Provisional application No. 62/222,472, filed on Sep. 23, 2015.

(51) Int. Cl.
*H04L 29/08* (2006.01)
*G06F 16/951* (2019.01)
(Continued)

(52) U.S. Cl.
CPC .......... *H04L 67/22* (2013.01); *G06F 16/951* (2019.01); *G06Q 30/0251* (2013.01);
(Continued)

(58) Field of Classification Search
CPC .................. H04L 41/22; H04L 43/04
See application file for complete search history.

(56) References Cited

U.S. PATENT DOCUMENTS 4,360,875 A    11/1982  Behnke
5,604,676 A     2/1997  Penzias
(Continued)

FOREIGN PATENT DOCUMENTS

| EP | 1372309 | 12/2003 |
|---|---|---|
| WO | 2001095642 A2 | 12/2001 |
| WO | 2007/002604 | 1/2007 |

OTHER PUBLICATIONS

Hastie, et al., "The Elements of Statistical Learning, Data Mining, Inference and Prediction" Second Edition, copyright 2009, Chapter 2: "Overview of Supervised Learning", pp. 9-39_If.
(Continued)

*Primary Examiner* — Adnan M Mirza
(74) *Attorney, Agent, or Firm* — Stuart H. Mayer; Mayer & Williams PC

(57) ABSTRACT

A user device containing sensors is delivered customized services without utilizing private user data or while only using it in highly constrained ways. This is accomplished by sending one or more queries to the user device. Each query requests a binary response and each query inquires whether or not the user device has obtained one or more specified parameter values, or range of parameter values, from one or more sensors incorporated in or in communication with the user device. For each query a binary response is received, which indicates that the user device has or has not obtained the one or more specified parameter values, or the range of parameter values, about which the respective query is inquiring.

13 Claims, 12 Drawing Sheets

(51) Int. Cl.
*H04W 4/35* (2018.01)
*H04W 4/60* (2018.01)
*G06Q 30/02* (2012.01)

(52) U.S. Cl.
CPC ..... *G06Q 30/0252* (2013.01); *G06Q 30/0255* (2013.01); *G06Q 30/0261* (2013.01); *G06Q 30/0267* (2013.01); *G06Q 30/0269* (2013.01); *H04L 67/16* (2013.01); *H04L 67/18* (2013.01); *H04W 4/35* (2018.02); *H04W 4/60* (2018.02)

(56) References Cited

U.S. PATENT DOCUMENTS

| | | |
|---|---|---|
| 5,608,778 A | 3/1997 | Partridge, III |
| 6,248,065 B1 | 6/2001 | Brown |
| 6,601,012 B1 | 7/2003 | Horvitz |
| 6,697,730 B2 | 2/2004 | Dickerson |
| 6,829,478 B1 | 12/2004 | Layton |
| 6,912,386 B1 | 6/2005 | Himberg |
| 7,206,559 B2 | 4/2007 | Meade |
| 7,224,698 B2 | 5/2007 | Kreiner |
| 7,226,494 B1 | 5/2007 | Schwartz |
| 7,266,595 B1 | 9/2007 | Black |
| 7,302,481 B1 | 11/2007 | Wilson |
| 7,363,031 B1 | 4/2008 | Aisa |
| 7,379,464 B2 | 5/2008 | Kreiner |
| 7,400,891 B2 | 7/2008 | Aaron |
| 7,539,723 B2 | 5/2009 | Agrawal |
| 7,548,886 B2 | 6/2009 | Kirkland |
| 7,548,915 B2 | 6/2009 | Ramer |
| 7,561,535 B2 | 7/2009 | Naqvi |
| 7,672,297 B2 | 3/2010 | Naqvi |
| 7,724,753 B2 | 5/2010 | Naqvi |
| 7,756,633 B2 | 7/2010 | Huang |
| 7,773,972 B2 | 8/2010 | Croome |
| 7,792,528 B2 | 9/2010 | Naqvi |
| 7,802,292 B2 | 9/2010 | Shaw |
| 7,840,427 B2 | 11/2010 | O'Sullivan |
| 7,856,226 B2 | 12/2010 | Wong |
| 7,864,936 B2 | 1/2011 | Naqvi |
| 7,890,743 B2 | 2/2011 | Buchanan |
| 8,119,119 B2 | 2/2012 | Mallet et al. |
| 8,170,534 B2 | 5/2012 | Naqvi |
| 8,195,188 B2 | 6/2012 | Fomukong |
| 8,285,571 B2 | 10/2012 | Demirdjian |
| 8,320,272 B2 | 11/2012 | Kahn |
| 8,326,001 B2 | 12/2012 | Free |
| 8,427,303 B1 | 4/2013 | Brady |
| 8,432,899 B2 | 4/2013 | Naqvi |
| 8,433,303 B2 | 4/2013 | Naqvi |
| 8,479,266 B1 | 7/2013 | Delker |
| 8,483,373 B2 | 7/2013 | Naqvi |
| 8,504,921 B2 | 8/2013 | Wilson |
| 8,532,069 B2 | 9/2013 | Balwani |
| 8,553,866 B2 | 10/2013 | Naqvi |
| 8,565,820 B2 | 10/2013 | Riemer |
| 8,595,103 B1 | 11/2013 | Wargin |
| 8,611,334 B2 | 12/2013 | Naqvi |
| 8,620,354 B2 | 12/2013 | Beasley |
| 8,666,894 B1 | 3/2014 | Buch |
| 8,726,390 B1 | 5/2014 | Martini |
| 8,730,945 B2 | 5/2014 | Naqvi |
| 8,787,936 B2 | 7/2014 | Tibbitts |
| 8,874,701 B2 | 10/2014 | Guinard |
| 8,929,857 B2 | 1/2015 | Baker |
| 8,931,001 B2 | 1/2015 | Wilson |
| 8,947,696 B1 | 2/2015 | Uyttendaele |
| 8,953,566 B2 | 2/2015 | Hegde |
| 9,077,611 B2 | 7/2015 | Cordray |
| 9,125,106 B1 | 8/2015 | Velusamy |
| 9,300,739 B2 | 3/2016 | Deprun |
| 9,325,510 B2 | 4/2016 | Deprun |
| 9,467,562 B2 | 10/2016 | Bozionek |
| 9,537,866 B2 | 1/2017 | Mcdonald |
| 2002/0130176 A1 | 9/2002 | Suzuki |
| 2002/0188589 A1 | 12/2002 | Salmenkaita et al. |
| 2003/0071117 A1 | 4/2003 | William |
| 2003/0073411 A1 | 4/2003 | William |
| 2003/0073432 A1 | 4/2003 | William |
| 2004/0125993 A1 | 7/2004 | Zhao |
| 2004/0137925 A1 | 7/2004 | Lowe |
| 2004/0256474 A1 | 12/2004 | Park |
| 2005/0158618 A1 | 7/2005 | Liberatore et al. |
| 2006/0069717 A1 | 3/2006 | Mamou |
| 2006/0092037 A1 | 5/2006 | Neogi |
| 2006/0179056 A1 | 8/2006 | Rosenberg |
| 2006/0270350 A1 | 11/2006 | Kim |
| 2007/0055785 A1 | 3/2007 | Stevens |
| 2007/0115940 A1 | 5/2007 | Kamen |
| 2007/0150480 A1 | 6/2007 | Hwang |
| 2007/0150599 A1 | 6/2007 | Neogi |
| 2007/0155402 A1 | 7/2007 | Van Erlach |
| 2007/0281713 A1 | 12/2007 | Mullen |
| 2008/0052395 A1 | 2/2008 | Wright |
| 2008/0092155 A1 | 4/2008 | Ferrone |
| 2008/0092156 A1 | 4/2008 | Ferrone |
| 2008/0137646 A1 | 6/2008 | Agarwal |
| 2008/0162346 A1 | 7/2008 | Aaron |
| 2008/0164308 A1 | 7/2008 | Aaron |
| 2008/0195664 A1 | 8/2008 | Maharajh |
| 2008/0248815 A1 | 10/2008 | Busch |
| 2008/0270172 A1 | 10/2008 | Luff |
| 2008/0294487 A1 | 11/2008 | Nasser |
| 2009/0077645 A1 | 3/2009 | Kottahachchi |
| 2009/0085803 A1 | 4/2009 | Mergen |
| 2009/0119384 A1 | 5/2009 | Kreiner |
| 2009/0124241 A1 | 5/2009 | Krishnaswamy |
| 2009/0132362 A1 | 5/2009 | Fisher |
| 2009/0152343 A1 | 6/2009 | Carter |
| 2009/0169018 A1 | 7/2009 | Deisher |
| 2009/0183178 A1 | 7/2009 | Imai |
| 2009/0204612 A1 | 8/2009 | Keshavarz-Nia et al. |
| 2009/0222907 A1 | 9/2009 | Guichard |
| 2009/0234850 A1 | 9/2009 | Kocsis |
| 2009/0252113 A1 | 10/2009 | Take |
| 2009/0264131 A1 | 10/2009 | Wu |
| 2009/0299853 A1 | 12/2009 | Jones |
| 2009/0299990 A1 | 12/2009 | Setlur |
| 2009/0309711 A1 | 12/2009 | Adappa |
| 2010/0009657 A1 | 1/2010 | Dingier |
| 2010/0057485 A1 | 3/2010 | Luft |
| 2010/0057562 A1 | 3/2010 | Gabbay |
| 2010/0088532 A1 | 4/2010 | Pollack |
| 2010/0107225 A1 | 4/2010 | Spencer |
| 2010/0113065 A1 | 5/2010 | Narayan |
| 2010/0121684 A1 | 5/2010 | Morio |
| 2010/0122281 A1 | 5/2010 | Wang |
| 2010/0153289 A1 | 6/2010 | Schneiderman |
| 2010/0167691 A1 | 7/2010 | Howarter |
| 2010/0191604 A1 | 7/2010 | Raleigh |
| 2010/0225493 A1 | 9/2010 | Zishaan |
| 2010/0227691 A1 | 9/2010 | Karsten |
| 2010/0299451 A1 | 11/2010 | Yigang |
| 2010/0319059 A1 | 12/2010 | Agarwal |
| 2010/0323657 A1 | 12/2010 | Barnard |
| 2011/0009107 A1 | 1/2011 | Guba |
| 2011/0010543 A1 | 1/2011 | Schmidt |
| 2011/0054904 A1 | 3/2011 | Fenton |
| 2011/0077028 A1 | 3/2011 | Wilkes |
| 2011/0093161 A1 | 4/2011 | Zhou |
| 2011/0099040 A1 | 4/2011 | Felt |
| 2011/0150204 A1 | 6/2011 | Halachmi |
| 2011/0153759 A1 | 6/2011 | Rathod |
| 2011/0158090 A1 | 6/2011 | Riley |
| 2011/0167105 A1 | 7/2011 | Ramakrishnan |
| 2011/0202293 A1 | 8/2011 | Kobraei |
| 2011/0202485 A1 | 8/2011 | Cutler |
| 2011/0208822 A1 | 8/2011 | Rathod |
| 2011/0225293 A1 | 9/2011 | Rathod |
| 2011/0235549 A1 | 9/2011 | Ahlers |
| 2011/0257973 A1 | 10/2011 | Chutorash |
| 2011/0275321 A1 | 11/2011 | Zhou |
| 2011/0276396 A1 | 11/2011 | Rathod |
| 2011/0276406 A1 | 11/2011 | Sneyders |

(56) References Cited

U.S. PATENT DOCUMENTS

| | | |
|---|---|---|
| 2011/0276981 A1 | 11/2011 | Clohessy |
| 2011/0289392 A1 | 11/2011 | Naqvi |
| 2011/0294520 A1 | 12/2011 | Zhou |
| 2011/0313804 A1 | 12/2011 | Camp |
| 2012/0010867 A1 | 1/2012 | Eder |
| 2012/0021770 A1 | 1/2012 | Naqvi |
| 2012/0023554 A1 | 1/2012 | Murgia |
| 2012/0028624 A1 | 2/2012 | Jedlicka |
| 2012/0041983 A1 | 2/2012 | Jennings |
| 2012/0101903 A1 | 4/2012 | Oh |
| 2012/0150601 A1 | 6/2012 | Fisher |
| 2012/0165042 A1 | 6/2012 | Cho |
| 2012/0177045 A1 | 7/2012 | Berman |
| 2012/0214463 A1 | 8/2012 | Smith |
| 2012/0258161 A1 | 10/2012 | Patel |
| 2012/0271715 A1 | 10/2012 | Morton |
| 2012/0303439 A1 | 11/2012 | Flitcroft |
| 2012/0316962 A1 | 12/2012 | Rathod |
| 2013/0029693 A1 | 1/2013 | Bradley |
| 2013/0094403 A1* | 4/2013 | Park ................. H04W 4/80 370/255 |
| 2013/0132277 A1 | 5/2013 | Naqvi |
| 2013/0150117 A1 | 6/2013 | Rodriguez |
| 2013/0151343 A1 | 6/2013 | Phan |
| 2013/0246175 A1 | 9/2013 | Bilange |
| 2013/0290106 A1 | 10/2013 | Bradley |
| 2013/0295908 A1 | 11/2013 | Zeinstra |
| 2014/0051485 A1 | 2/2014 | Wang et al. |
| 2014/0087760 A1 | 3/2014 | Bennett |
| 2014/0122528 A1 | 5/2014 | Yamagishi |
| 2014/0129393 A1 | 5/2014 | Soon-Shiong |
| 2014/0129942 A1 | 5/2014 | Rathod |
| 2014/0143341 A1 | 5/2014 | Brady |
| 2014/0172373 A1* | 6/2014 | Edwards ................. G06F 3/011 702/189 |
| 2014/0258471 A1 | 9/2014 | Etchegoyen |
| 2014/0295804 A1 | 10/2014 | Naqvi |
| 2014/0335889 A1 | 11/2014 | Witych |
| 2014/0365334 A1 | 12/2014 | Hurewitz |
| 2014/0370869 A1 | 12/2014 | Naqvi |
| 2015/0046828 A1 | 2/2015 | Desai et al. |
| 2015/0073901 A1 | 3/2015 | Arnold |
| 2015/0088701 A1 | 3/2015 | Desmarais |
| 2015/0120749 A1 | 4/2015 | Phanishayee et al. |
| 2015/0161665 A1 | 6/2015 | Grimes |
| 2015/0289111 A1 | 10/2015 | Ozkan |
| 2015/0356657 A1 | 12/2015 | Pas |
| 2016/0150467 A1 | 5/2016 | Shaw |
| 2016/0171486 A1 | 6/2016 | Wagner |
| 2017/0208459 A1 | 7/2017 | Raleigh |
| 2017/0215138 A1 | 7/2017 | Shaw |

OTHER PUBLICATIONS

Tofel, "With New Apps Google Now May Be Your Future Home Screen", dated Jan. 30, 2015. Downloaded at https:/ /gigaom.com/ 2015/01 /30/with-new-apps-google-now-may-be-your -future-home-screen/, 8 pages.

Frost, "iBeacon in iOS 8 getting location based notifications, plus: FCC filing suggests Apple to launch own iBeacon hardware", dated Sep. 2, 2014. Downloaded at http://www.macworld.co.uk/news/iosapps/apples-plans-for-ibeacon-hardware-new-ios-8-location-notifications-3542708/, 5 pages.

Evgeny Morozov: To Save Everything, Click Here, www.publicaffairsbooks.com; see also Perseus Books, 2013.

Author Unknown, "Technical Solution Ideas" downloaded at https://web.archive.org/web/20100823055621/http:/lddfn.Jrg/ideas.asp Downloaded on May 9, 2017.

Author Unknown "Solution Providers I Distracted Driving Foundation" 5 pages, downloaded at http://www.ddfn.org/tmlutionsproviders/ on Mar. 27, 2017.

Author unknown, "Exempt from automatic restriction of functionality moving phones accompanied by an override ransmitter" downloaded at http://www.ddfn.org/pdfs/HaleyPhoneRestrictionSystemv24 7 .1 O .pdf downloaded May 9, 2017.

O.uthor Unknown, What is Drive Alive? downloaded http://www.ddfn.org/pdfs/DDFNdocumentDriveAlive.pdf, downloaded May 9, 2017.

Author Unknown, "Car Key Jams Teen Drivers' Cell Phones" copyright 2008 downloaded at https://web.archive.org/web/20090214155734/http://www.unews.utah.edu/p/?r=1208081 on Mar. 21, 2017, 3 pages.

Author Unknown, "K2SD Workflow", copyright 2007, 2 pages downloaded at https://web.archive.org/Neb/20090429012022/http:/lkey2safedriving.net/T echnology .aspx, downloaded May 9, 2017.

Author Unknown, "Textecution—Premium Mobile Device Safety Application" copyright 2009 downloaded at https://web archive.org/web/20090705190653/http:/textecution .com/how_ does _it_ work.php, downloaded on May 9, 2017.

Author Unknown, "cellcontrol_Reducing Distractions While Driving", copyright 2009, downloaded at https://web.archive.org/web/20091208041109/http:/lcellcontrol.com/index.html, downloaded on May 9, 2017.

Author Unknown, "cellcontrol_How It Works!" copyright 2009 downloaded at https://web.archive.org/Neb/20091209040335/http:/lwww.cellcontrol.com/how.html, downloaded on May 9, 2017.

Jay Przybyla, "Cell Phone Use While Driving: A Literature Review and Recommendations" dated Dec. 11, 2008; downloaded at http://www.civil.utah.edu/~zhou/cell_phone_and_distracted_driver.pdf, ttownloaded on May 9, 2017.

David Teater,"Distracted driving" copyright 2009 downloaded at http://www.nsc.org/Membership%20Site%20Document%20Library/Recorded-Webinars/Corporate%20Distracted%20Driving%20Copy%2ONSC%20National%20Safety%20Month.pdf, downloaded on May 9, 2017.

Fan "How Cards are Quitely Transforming the Web", Feb. 2015, 10 pages.

Constine, Vurb is Crazy Engough to Fight Google, Feb. 2015 14 pages.

UberCab Takes the Hassle Out of Booking a Car Service by Leena Rao on Jul. 5, 2010, 6 pages downloaded at https://web .archive.org/web/20100708015701 /http :/tech crunch.com/201 0/0 7 /05/ubercab-takes-the-hassle-out-of-booking-a-car-service/.

Christin et al. A survey on privacy in mobile participatory sensing applications. The Journal of Systems and Software; vol. 84, No. 11; 1928-1946, 2011. [retrieved on Jul. 11, 2016). Retrieved from the Internet. <URL:flp://130.83.198.178/papers/CRKH 11.pdf>. entire documen.

\* cited by examiner

|  | [0-5] | [6-10] | [11-15] | [16-20] |
|---|---|---|---|---|
| 1ST ST | X | X | X | X |
| 2ND ST* | X | X | X |  |
| 3RD ST | X | X |  |  |
| 4TH ST* | X |  |  |  |

FREQUENCY (columns), LOCATION (rows)

FIG. 3B

| STATE (LABEL) | PARAMETERS | LOCATION-DERIVING DEVICES |
| --- | --- | --- |
| DORMANT | | |
| A | [L1,T1,G1,NULL] | G1 |
| B | [L2,T2,B1,S1] | B1 |
| C | [L3,T3,B2,S2] | B2 |
| D | [L4,T4,B3,S3] | B3 |
| E | [L5,T5,B4,S4] | B4 |
| F | [L6,T6,G2,NULL] | G2 |
| DORMANT | | |

LEGEND:
T1,T2,T3,T4,T5,T6: TIME
L1,L2,L3,L4,L5,L6: LOCATIONS
G1,G2: GEO-FENCES
B1,B2,B3,B4: BEACONS
S1,S2,S3,S4: SERVICES

*FIG. 5*

METHOD AND SYSTEM FOR USING DEVICE STATES AND USER PREFERENCES TO CREATE USER-FRIENDLY ENVIRONMENTS

CROSS-REFERENCE TO RELATED APPLICATION

This application claims priority to U.S. Provisional Application No. 62/222,472, filed Sep. 23, 2015 entitled "METHOD AND SYSTEM FOR MODIFYING USER BEHAVIOR THROUGH MARKETING STRATEGIES USING MOBILE INTERACTIONS", the contents of which is incorporated by herein by reference.

BACKGROUND

User devices contain many kinds of internal sensors. Additionally, user devices exist in proximity to other smart devices and sensors that sense various parameters and properties of user devices and the environment. As a result, more and more user data may be gathered by network service providers to customize delivered services.

SUMMARY

In accordance with one aspect of the subject matter disclosed herein, a method is presented for delivering at least one service to a user device over one or more communications network. In accordance with the method, one or more queries is sent to a user device. Each query requests a binary response and each query inquires whether or not the user device has obtained one or more specified parameter values, or range of parameter values, from one or more sensors incorporated in or in communication with the user device. For each query a binary response is received, which indicates that the user device has or has not obtained the one or more specified parameter values, or the range of parameter values, about which the respective query is inquiring. One or more user device states are defined based on the queries and the binary responses thereto. Each of the user device states is a function of the one or more of the specified parameter values, or the range of parameter values, that the user device has indicated as being obtained from the one or more sensors. A service is selected to be delivered to a designated user device over the one or more communication networks based at least in part on the one or more user device states that have been defined. The selected service is delivered to the designated user device.

BRIEF DESCRIPTION OF THE DRAWINGS

FIG. 3B shows an alternative way of representing a histogram.
FIG. 5 describes a simple journey.

DETAILED DESCRIPTION

Figure 1:
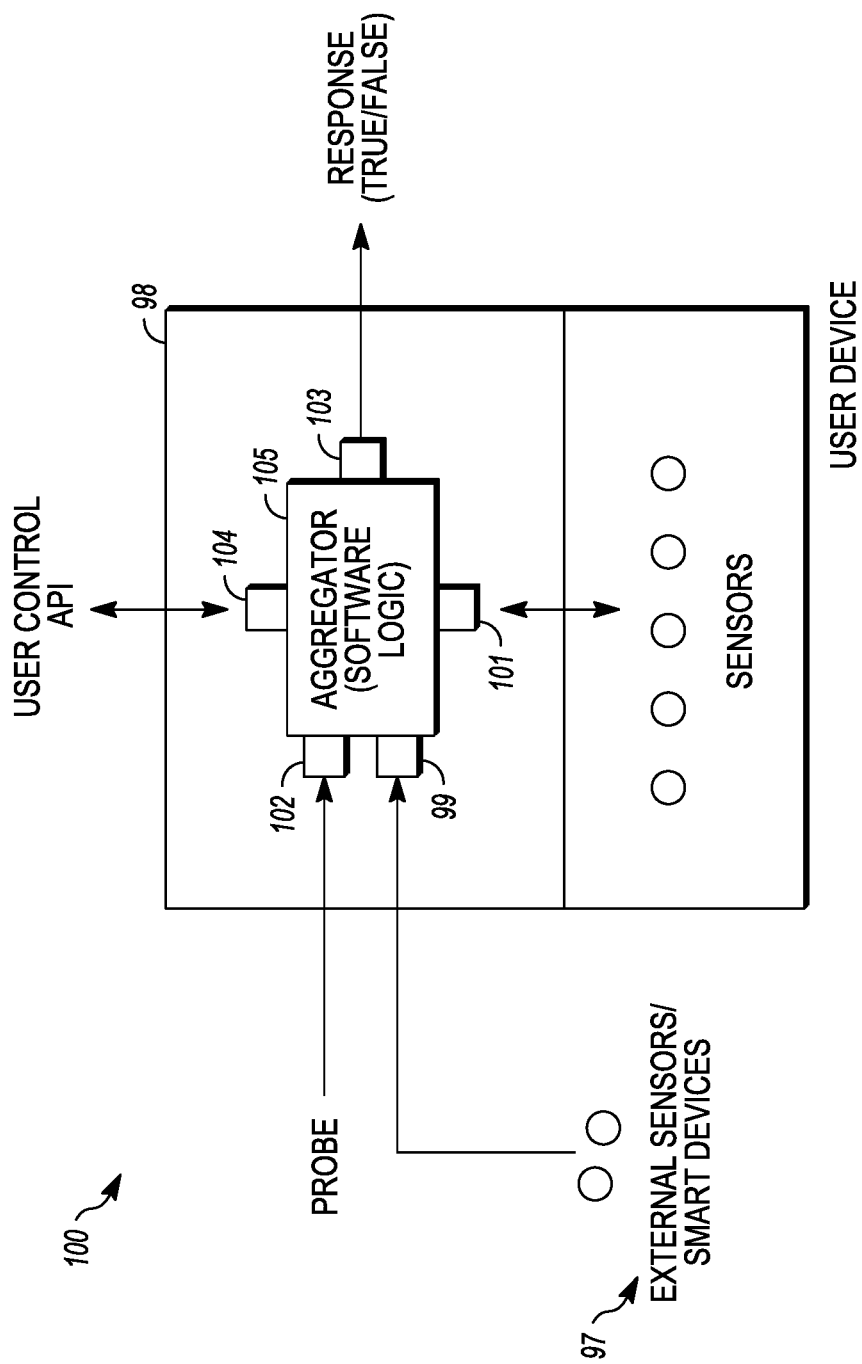
FIG. 1 shows the layout of a user device.

The following detailed descriptions are made with respect to the various figures included in the application and may refer to specific examples in said drawings; however, it is to be noted that such specific cases do not limit the generality of the various aspects of the invention. The elements of the present invention are detailed by the claims, embodiments and the figures contained herein.

It is commonplace for user devices, e.g., mobile/smart phones, to receive services from network service providers. However, many users often find such messages annoying and intrusive, bar some fortuitous "moments" when such messages prove useful or entertaining. Users are also increasingly concerned that network service providers get access to and use personal data of users to customize such services.

Technological improvements of the present invention are concerned with providing services to users without using their personal data (or using their personal data in a highly constrained manner), thus preserving privacy of users. Even when user data is used, it is done so in a constrained manner so as to dissuade assembling various user data items into a larger user profile. The network services envisioned in the present invention rely instead on data sensed by user devices or by smart devices and the sensed data is used in highly constrained ways. The services that are provided to the user may comprise services delivered to his user device or to one or more "nearby" smart devices, where the term "nearby" is explained later. (In one embodiment, for example, the term "nearby" may be taken to imply the immediate geographical vicinity of the user. In another embodiment, devices "A" and "B" may be considered to be "near" if they record the same user action, or have related orientations, etc.)

A user device is a device containing a processor, one or more sensors, and supports one or more network connections (wireless or wired). Network services are provided to user devices by one or more servers in connection with the one or more user devices. Examples of user devices are mobile phones, smart phones, tablets, smart glasses and watches, Virtual/Augmented Reality (VR/AR) devices, etc.

Most user devices contain various kinds of sensors that may measure various properties or parameters, e.g., location, altitude, acceleration, motion, proximity, heat, temperature, audio, light, etc.

User devices may also be surrounded by various kinds of smart devices that may measure various environmental properties or parameters, e.g., indoor GPS location sensing devices and geo-fences, location-deriving devices such as beacons and Bluetooth Low Energy (BLE) devices, etc. Many modern mobile phones contain GPS sensors today. Indoor GPS systems have been proposed in prior art in those cases where conventional GPS may lose accuracy. RFID (Radio Frequency Identifier) devices are further examples that allow more accurate location deriving than conventional GPS systems. Proximity to certain items indicated by planogram data or by RFID labels further improves accuracy of location derivation. (Planograms are datasets describing the placement of items in retail or other such stores.) VR/AR devices sense topological and orientation of devices, etc.

Conventionally, sensors contained within user devices (or sensor/smart devices in range of one or more user devices) may provide data to specialized software logic in the user device that may aggregate such data and provide it to various application programs (app). The (aggregated) data may also be transmitted to one or more network servers where it may be stored and analyzed, or provided to other servers via an Application Programming Interface (API).

A key point to note is that when data is received from an internal or external sensor/smart device, one or more apps may be "triggered" and, hence, may become capable of receiving services from the network. (The apps are assumed to be capable of establishing connections to named servers via fixed/wireless networks; hence, apps residing on the user device may be said to be in connection with the servers.)

Stated in a different way, user devices may be taken to exist in a multi-dimensional space characterized by various parameters such as location, temperature, altitude, acceleration, etc. A point in such a space may be represented as a n-tuple of values (i.e., a vector), e.g., [L, T, S, . . . ] where "L" may represent location, "T" the temperature, and "S" the service being rendered to the user device at this point, etc.

Given two points in such n-dimensional space, we may calculate the "distance" between them as explained in prior art. For example, if we restrict ourselves to two spatial dimensions (such as Euclidean space) then the distance metric is the familiar Euclidean distance between two planar points.

Terminological Note: The data generated by sensor and smart devices, when viewed in terms of a n-dimensional space, corresponds to points in that space. The term "nearby" used above may now be explained as follows. Given the n-dimensional distance between two points, we say that the two points are "nearby" if the distance between them is less than some pre-determined value. Thus, relationships between device data may be represented as distance metrics in the n-dimensional space.

Illustrative Embodiment

We consider user devices situated in an n-dimensional space characterized by (internal or external) sensors and smart devices. FIG. 1 shows a user device 100 that contains various internal sensor devices 98 and specialized software logic 105 that may receive commands on interface 102 and 104. Commands received on interface 102 are called probes. Commands received on interface 104 are user commands. Logic 105 may use interface 103 to output binary (true/false) responses; it may also respond to user commands using interface 104. The user device may also receive data from external sensor devices or smart devices 97 on interface 101.

Conventionally, user devices such as the device depicted in FIG. 1 generate (sensor and user application) data that is analyzed by applications on the user device and/or by servers connected to the user devices.

In the present invention, the user device stores data from internal and external sensors or from user commands and actions on the device itself. It may then respond to specific commands called probes as explained below.

Consider a server connected to such a user device. The server may issue a probe to the user device asking for data related to its location, ambient temperature, or device orientation, etc. The user device may then respond to such probes by issuing binary responses comprising true/false (yes/no) answers. Specialized software logic in the server may be used to decide what a probe needs to interrogate and the way the corresponding response is to be analyzed. We present further examples of such considerations later.

Such a system of probes issued by server(s) and responses to probes generated by user devices enables the methods of the present invention to determine what services are to be delivered to a user device, at what "moments", etc. That is, a service delivery schedule may be constructed whose components specify, inter alia, what service is to be provided, when, using what device, what nearby devices, etc. That is, servers issue probes based on specialized software logic and use the resulting responses to build models, e.g., rules, that may then dictate the delivery and customization of services.

Since the responses and the data are in the control of users (via their user devices), it is seen that the users get to exercise control over what data is shared and may, further, limit the amount of data that is shared (as explained below).

Figure 2:
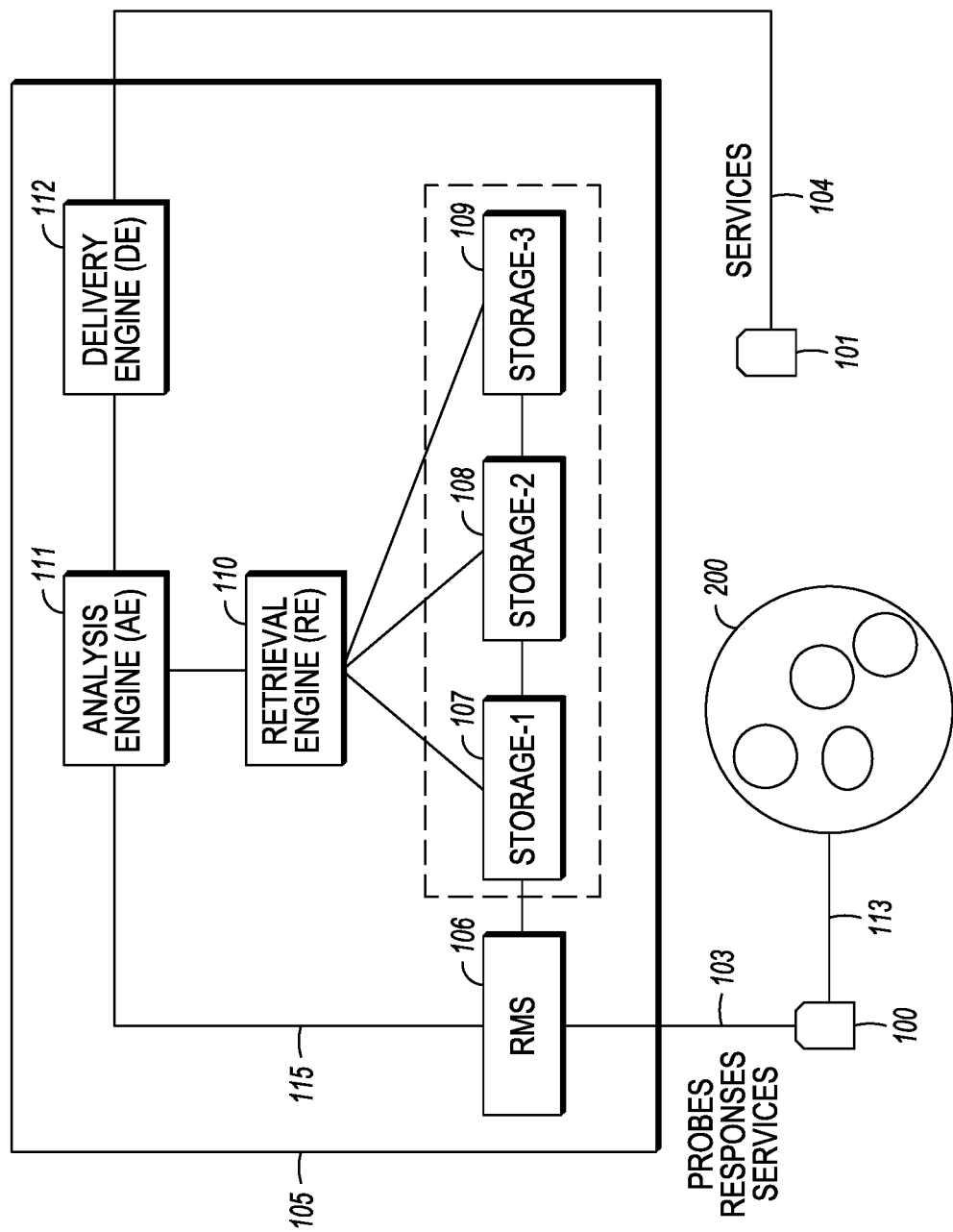
FIG. 2 shows the general system of the invention

FIG. 2 shows an exemplary system for an embodiment of the present invention.

A user device 100 is surrounded by external sensor/smart devices 200 that are in communication with the user device 100 via link 113. The user device 100 itself may have internal sensors (not shown but discussed in FIG. 1 above). User device 100 is connected to one or more servers 105, typically referred to as a cloud server system, a server complex, etc.

RMS 106 (Response Management System) is a collection of one or more server(s) containing specialized logic. One of the functions performed by RMS is to generate probes to user devices and collect the responses. Another function is to store the received responses in storage systems 107, 108 and 109. We show multiple storage systems to possibly distinguish between storage systems using different technologies such as data retrieval speeds and capacities. Alternatively, a single storage system may also be used.

Once the response data has been stored, one or more servers called the Retrieval Engine (RE) 110 accesses the stored data at the command of another collection of servers called the Analysis Engine (AE) 111. A purpose of AE 111 is to analyze the response data retrieved by RE 110 and to construct models such as rules controlling the delivery of services to user devices. The output of the AE 111 is a delivery schedule comprising the mode of delivery (which device), when to deliver, what to deliver, etc. AE 111 is thus in a unique position to decide what probes should be sent out to user devices so that appropriate models may be constructed. AE 111 instructs RMS 106 regarding the probes to be issued to user devices via connection 115 (cf. FIG. 2).

Once AE 111 has generated a delivery schedule for one or more services, it passes the delivery schedule to the Delivery Engine DE 112 whose function is to execute the delivery schedule. In particular, DE 112 may deliver to one or more devices such as device 100. Additional user devices may also be selected for receiving services. In one embodiment, geographically "nearby" devices such as 101 may be selected to receive services.

A user device receives sensed data from its internal sensors or from external sensors that are in connection with the device. The data received is processed to produce tables of data such as histograms, control charts, check sheets, Pareto charts, Scatter diagrams, Stratification diagrams, or control charts, etc. A histogram is a graphical representation of data produced by first "binning" the data into groups (bins) and then counting the number of values (frequency, occurrence) in each bin.

Figure 3A:
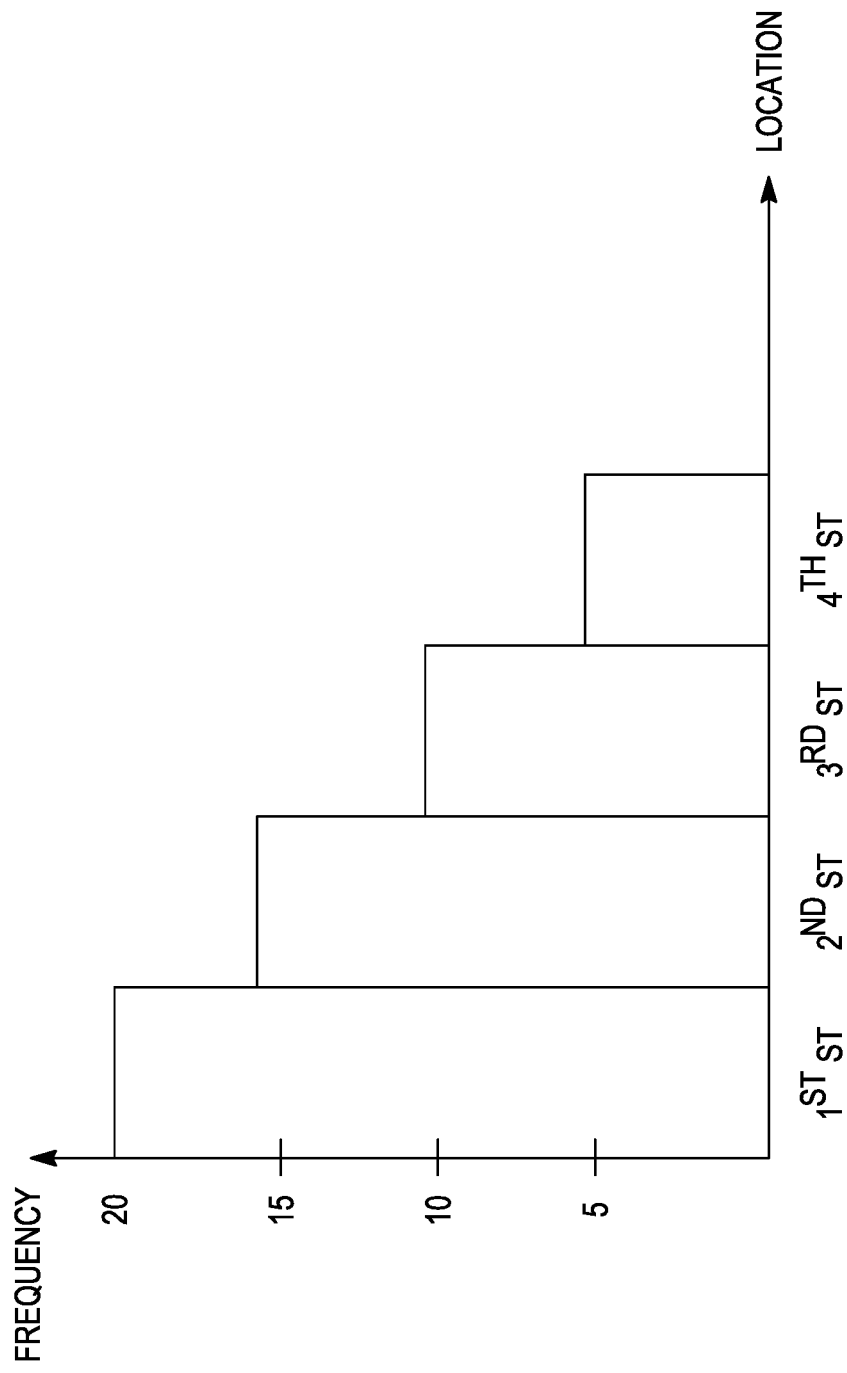
FIG. 3A shows an example of a histogram.

FIG. 3A shows a frequency histogram of sensor data (which in this example is device location data) for categories (bins) denoted "$1^{st}$ St", "$2^{nd}$ St", "$3^{rd}$ St", and "$4^{th}$ St". Methods to organize data into such tables are well known in prior art. FIG. 3B shows an alternative method of representing the data of FIG. 3A. In this case a tabular structure is shown. Note that the frequency data has been grouped into "bins" [$1^{st}$ St], [$2^{nd}$ St], etc.

It is the responsibility of the service logic of AE 111 to decide how the data collected by the Aggregator 105 (FIG. 1) is to be binned and what categories are to be used. For example, if AE 111 is interested in building models related to locations of user devices in Manhattan, New York City, it may use the grid of streets and avenues to specify the bins, e.g., $34^{th}$ St and $5^{th}$ Ave, 7 Ave and $48^{th}$ St, etc. If the logic of AE 111 was interested in building models of a user's body temperature, it may specify the bins as 98° F., 99° F., 100° F., etc.

Once the Aggregator 105 (cf. FIG. 1) has organized the data, a user of the user device is offered the opportunity to "mark" the data. The user may designate one or more "bins" as marked. In FIG. 3B, the marked bins are shown with an asterisk. The marked bins are meant to be bins that may be used in answering probes from RMS 106 (cf. FIG. 2).

As explained above, it is a function of AE 111 (cf. FIG. 2) to decide what probes it needs to be responded to so that it may build one or more models. The probes sent out by RMS 106 are dictated by the logic of AE 111.

Software logic 105 (cf. FIG. 1) within user device 100 may receive probes on interface 102 and may respond with a binary (true/false) response. The probes relate to the "bins" of the tables discussed above. Thus, for example, with reference to FIGS. 3A and 3B, a probe may specify "[$3^{rd}$ St, [6-10)]" to which the response may be "true", whereas the probe "[$3^{rd}$ St, [16-20]" may get the response "false". A probe on an unmarked bin gets an "error" response, e.g., any probes for bins [$2^{nd}$ St] and [$4^{th}$ St] get error responses. Note, that an entity that generates probes and aggregates the responses may not be able to re-create the table of data unless 1) all the bins are unmarked (a probe can access any bin), and 2) the entity is allowed an unlimited number of probes.

A user may not mark any bins in which case a probing entity will only get error responses to all its probes. In this manner a user may safeguard his privacy completely or selectively reveal certain aspects of his data. It is to be noted that the afore-mentioned scheme is only one method of safeguarding user data and many other schemes may be defined.

RMS logic (106, cf. FIG. 3) may probe user device 100 and organize the received responses accordingly.

RMS logic may define a state of a device as a function of one or more response categories (bins). Thus, if the RMS logic receives responses (to probes) related to Location and Temperature bins, it may be convenient to show the state of the user device as |Location, Temperature> where "Location" and "Temperature" respectively denote specific bins for which the responses were "true". For example, assume the probes "[$2^{nd}$ St]" and "[98° F.]" get the responses "true" and "true" respectively, from a user device. Then the user device may be assumed to be in state, |$2^{nd}$ St, 98° F.>. For the sake of brevity, we will describe the state of a user device using the latter form, keeping in mind the proviso that a state is always derived from response data that, in turn, relates to bins/categories into which the data has been organized.

A succession of probes may be sent to a user device in which the query included in a given probe depends on responses received from the user device to previous probes. In this way, for instance, the RMS logic can obtain more precise knowledge as to which state(s) the user device is in and/or has been in.

RMS logic may define, by way of example, a special state, called the dormant state, that satisfies the following conditions.

If response data indicates that the location of the device has not changed by more than e.g., 50 feet for 5 minutes, and If the device has not received any network service for more than a specified period of time, e.g., 5 minutes, then The device state is said to be "dormant" and denoted as "|dormant>".

Other sets of conditions may be used to define different notions of dormant states. A journey is a sequence of states of a device demarcated by two "dormant" states. A journey may be denoted as

|dormant>, |s1>, |s2>, |s3>, . . . , |dormant> where s1, s2, etc., are states distinct from the dormant state.

A state of a device may be a function of more than one response data. For example, s1=|A1,L1,B1,T1,S1> may describe a state of a device as a function of the following response data.

A1 is a user action (e.g., user clicked an icon or launched an app) or a user input received by the user device, at time T1 when service S1 was delivered to the device at location L1 determined by location-deriving sensor, while the device was in range of beacon device B1. Note that A1, L1, B1, T1 and S1 denote response data from bins or categories.

In summary, RMS (106, cf. FIG. 2) may probe sensor data and then assemble the received responses into states of a user device. A journey of a user device is a sequence of states bookended by the dormant state. States are then assembled into one or more journeys. AE 111 may analyze the journeys (as explained later) to determine delivery schedules. The services may be delivered to the user device 100 using the Delivery Engine 112, or other device 101 on behalf of device 100.

Figure 4:
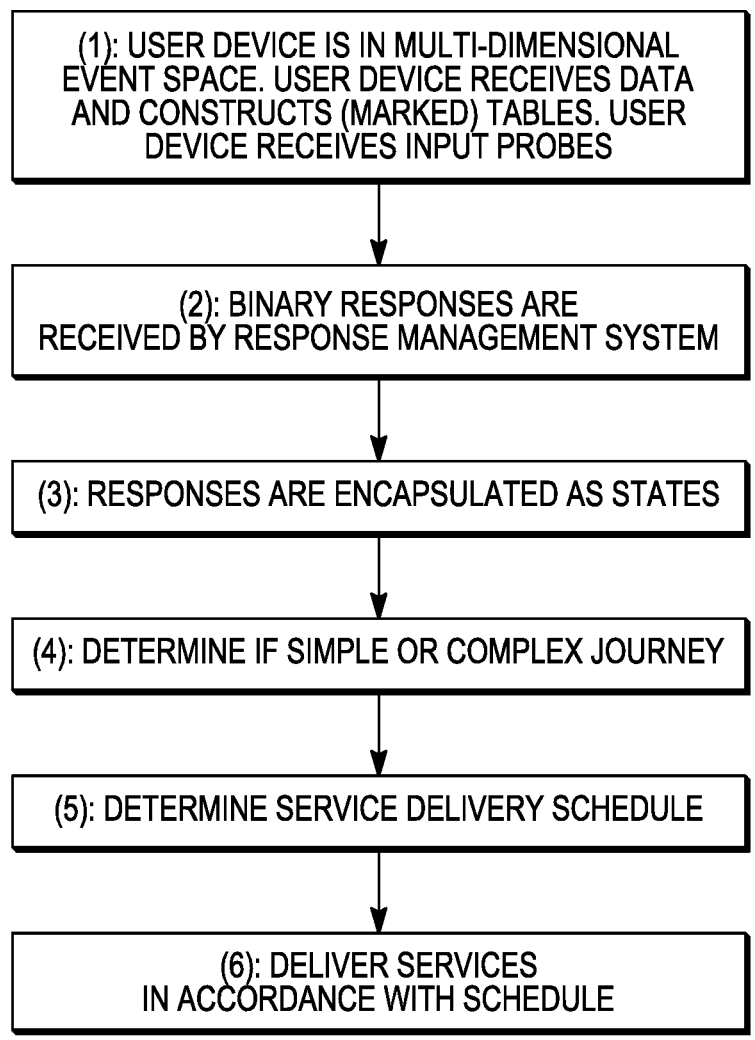
FIG. 4 is a flowchart showing one example of the present invention.

We are now in a position to describe the overall general method of the present invention (FIG. 4).

In step 1, in an initialization phase, a user device receives sensor data and organizes it into data structures (tables) as discussed above. Users may be invited to mark the organized data. Next, probes may be received by the user device with respect to the organized data and binary (true/false) responses may be generated.

In step 2, the responses are received by a Response Management System (RMS). The responses received by the RMS comprises true/false values for various categories/bins into which the data has been organized by the user device.

In step 3, the responses are analyzed and transformed into one or more states of a user device. A determination is then made if the states of the user device comprise a simple or a complex "journey" (explained later) in step 4.

In step 5, a service delivery schedule is constructed for one or more user devices.

In step 6, one or more services are delivered in accordance with the constructed schedule.

We now discuss specific kinds of journeys as analyzed by AE 111 (cf. FIG. 2). That is, we discuss the different kinds of models constructed by AE 111 from journey data. As noted above, probes are issued by RMS 106 on the request of AE 111 to user devices resulting in responses to probes. These responses are stored in Storage Systems 107, 108 and 109 from where they are retrieved by RE 110 at the request of AE 111 that then proceeds with its analysis.

FIG. 5 shows a journey in which the user device does 6 state changes, "A" through "F", between the two dormant states. The data in FIG. 5 may be described as follows. The user device transitions from an initial dormant state to state "A", from state "A" to state "B", etc.

Note that in this journey, there exist 6 possible states at which one or more services may be delivered to the user device, corresponding to the six states "A" through "F". A "moment" is a state of a user device in which services may be delivered to the user device.

As explained above, the data stored in Storage Systems 107, 108 and 109 (cf. FIG. 2) corresponds to points in a n-dimensional space comprising internal sensors of user devices and external sensor/smart devices. AE 111 may calculate several models of the space based entirely on sensed data. Examples of such models are as follows.

i. Model the importance of a location by calculating the number of user devices that have been delivered services at that location. [To compute, the AE 111 looks for all states that match the given location parameter.]
  ii. How many user devices were delivered services within the last hour? [To compute AE 111 matches all states based on the time parameter.]
  iii. What location-deriving sensor/smart device generated the most moments? In total? Over a certain time period? [To compute AE 111 counts all states for each user device in the journey, viz., G1, B1, B2, B3, B4 and G2 for the total time interval and finds the user device with the largest count value. For the second part of the query, the system repeats the latter computation for the given time interval. Note that geo-fences G1 and G2 may be thought of as being similar to GPS data sensors.

AE 111 may, in fact, construct sophisticated models or rules. For example, a rule may be constructed that users who have received more than one service in the past hour at locations L1 and L2 must not be delivered another service when they are near a third location indicated by the beacon device B1.

If 1) a user device has received service "S1" at location "L1", and service "S2" at location "L2" in the past one hour, and 2) if said user device comes into proximity of beacon device "B1" in a future state, then do not deliver service "S3" to it.

As another example, consider a user playing a VR/AR game on his user device. A server analyzes the user's previous game states and constructs a delivery schedule that sends instructions to the user in particular game situations that are detected as a function of the user action, device orientation, and object being displayed on the display of the user device (e.g., a particular monster). Thus, the rule could be represented as follows.

If 1) user device is in orientation "abc", and 2) user device is displaying object "xyz", and 3) user executes action "123", then deliver "content" to the device.

As noted, the exemplary journey of FIG. 5 presents six moments for the system to deliver services to a user device. In order to distinguish between "good" and "bad" moments (non-dormant states) we proceed as follows.

In some cases, when a service is delivered to a user device, it may elicit some actions from the user. Examples of such actions may be that the user clicks on the elements of delivered content, makes a purchase decision, launches an app, etc. These actions may cause the state of the device to change since user actions are generally detectable via the installed apps or sensors. Logic in AE 111 (cf. FIG. 2) may use the heuristic rule that good outcomes are those that cause a device to change its state. A "bad" outcome then would be that the user does not do anything, e.g., does not open the message sent to him, deletes the message without reading it, does not shake the device in annoyance, etc. That is, bad outcomes are those that do not cause state changes.

We emphasize that the above rule is an example of a heuristic and is not always true.

Software logic AE 111 (cf. FIG. 3) may use the notion of good/bad outcomes to construct rules/models that predict what a user may do next or in response to some delivered service. This is well discussed in prior art, e.g., machine learning techniques may be used to build such models.

In some situations, for example when the user has marked data elements to guard his privacy, building such models may be quite difficult or impossible. We now present a simple model that may be used when other model building attempts prove less beneficial.

Let the total number of services delivered to a user device over all moments in a journey be "N" and the number of those services with which the user interacts in some manner that indicates the user is responding positively to the service at moment s1 be "n". For instance, the detection of a user opening or clicking on a delivered service may indicate that the user is responding positively to the service. The ratio "n/N(s1)" will be called the magic ratio of state, "s1".

Note, if a state (moment) s1 has the magic ratio 0.45 and moment s2 has the magic ratio 0.32 then s1 is a "better" opportunity than s2. The simple idea behind the magic ratio concept is that delivered services at moment s1 got more responses compared to moment s2. The magic ratio is one example of a metric; it is possible to formulate many other such metrics.

A moment that has the largest magic ratio in a journey will be referred to as a magic moment. Note that the best ratio any moment can achieve is 1. It may be said that moments strive for the perfection by inching closer to unity.

As an example, prior art has proposed that offers made to a retail customer when said customer is in close geographical proximity to an item could be, or will be, quite effective. If a customer is standing next to where shirts are being displayed by a retailer and said customer receives a rebate offer on shirts, is he likely to click on such an offer?

Such a heuristic may indeed be quite effective. However, there is no empirical data to prove or disprove such a conjecture. The methods provided in this invention may be used to gather data on the effectiveness of such heuristics. That is, we may gather data on the effectiveness of "proximity-based" moments. We may then discover, for example, that magic moments are strongly correlated with proximity-based opportunities. Or we may determine otherwise.

Thus, our methods may be used to test models and ascertain their efficacy under a variety of situations (by taking collections of user devices and analyzing their states).

Method to Determine Magic Moments of a Journey.

i. In an initialization step, we use test data to assign magic ratios to all moments in a journey.
  ii. We skip the first few moments, say the first "k" moments, that occur. We remember the "best" magic ratio of the skipped opportunities. Call it "R1".
  iii. For the next moment, compare its magic ratio, say "X", to the remembered value "R1". If "R1" is larger than "X" skip this moment and wait for next opportunity. If "R1" is smaller than "X" then mark the current moment as a magic moment.
  iv. If we reach the end of the journey without marking any moment, mark the last moment as a magic moment.

Figure 6:
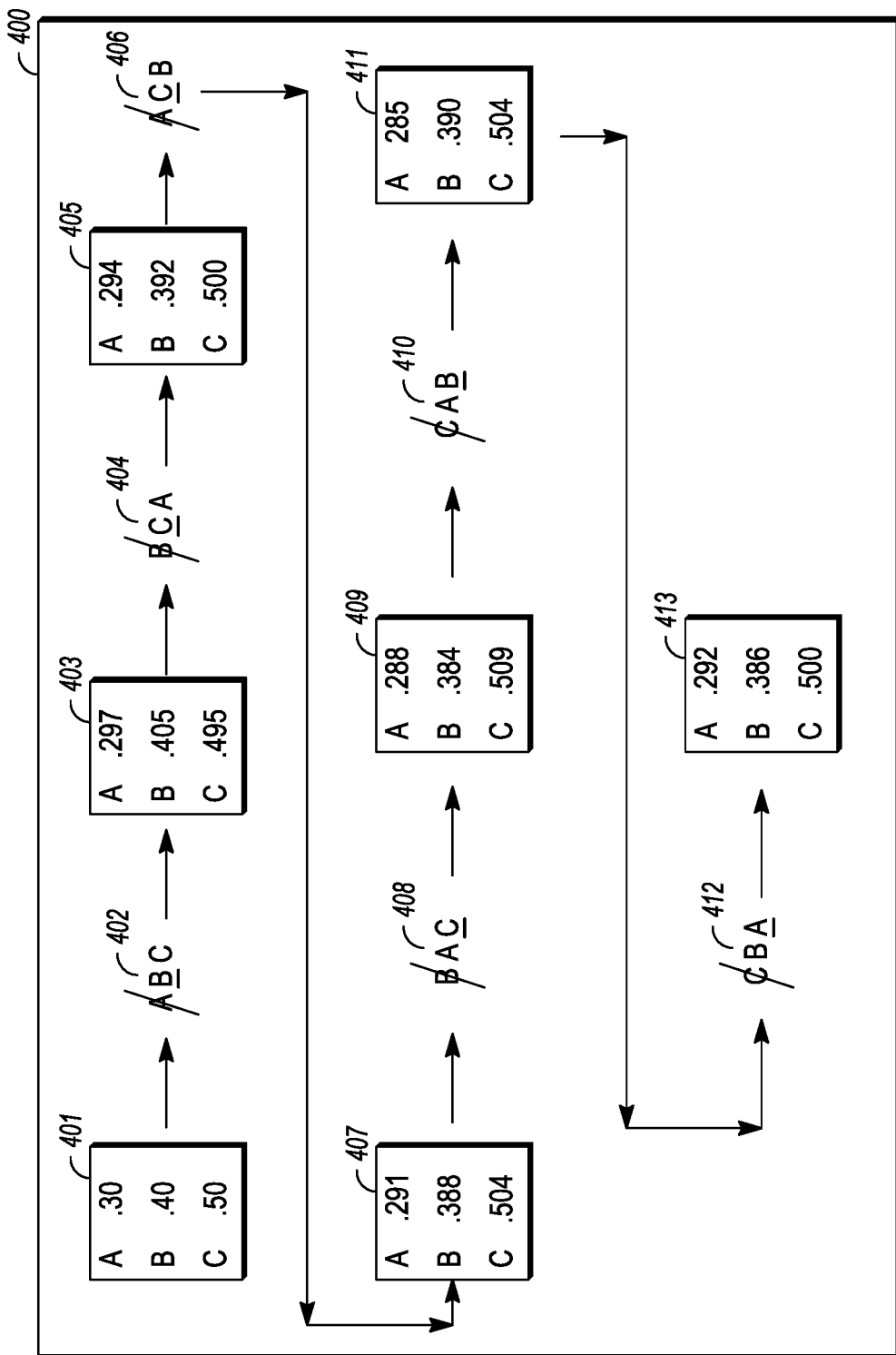
FIG. 6 shows an example analysis of simple journeys.

We illustrate the above procedure by recourse to FIG. 6 where we consider journeys in which exactly 3 moments occur, i.e., journeys of length 3. We call these moments "A", "B", and "C".

We will also assume that we will skip the first moment, i.e., parameter k=1. Table 401 shows the initial magic ratios established when the system is initialized.

Now consider the journey (A, B, C). This journey is shown in FIG. 6 as 402. In 402 we show that "A" is skipped (shown as crossed out). With reference to the values shown in table 401, we compare the ratio of "A" with the ratio of the next moment in the journey, "B", and since the former's ratio is less than the ratio of the latter, we designate "B" as the magic moment (shown as underlined).

Now we assume that the moment "B" results in the user taking some action; thus, we add 1 to the denominator and to the numerator of "B" giving the table of ratios shown in Table 403.

Now Table 403 shows the magic ratios when a second journey starts, let it be (B, C, A). Proceeding as above, the first moment, "B", will be skipped (k=1) and the next moment "C" will be designated as the magic moment. This is shown in 404. The updated table of ratios is shown in 405, FIG. 6.

For the next mobile device if the journey 406 (cf. FIG. 6) is (A, C, B) the moment "C" is the magic moment, and so on, for other permutations of the corresponding journey.

Thus, the process starts with Table 401 showing the magic ratios and ends with the final ratios as shown in Table 413. FIG. 6 shows only 6 journeys because all subsequent journeys will be one of the permutations shown in FIG. 6.

The parameter "k", i.e., the number of initial states that may be skipped, may be determined by recourse to training runs as discussed above using historical data or by using statistical sampling techniques.

In the preceding exposition we considered journeys that had a fixed number of moments. In many situations, we do not expect to know the exact number of moments in a journey. The best we can hope for is to provide a probabilistic estimate of the number of moments in a journey.

Figure 7:
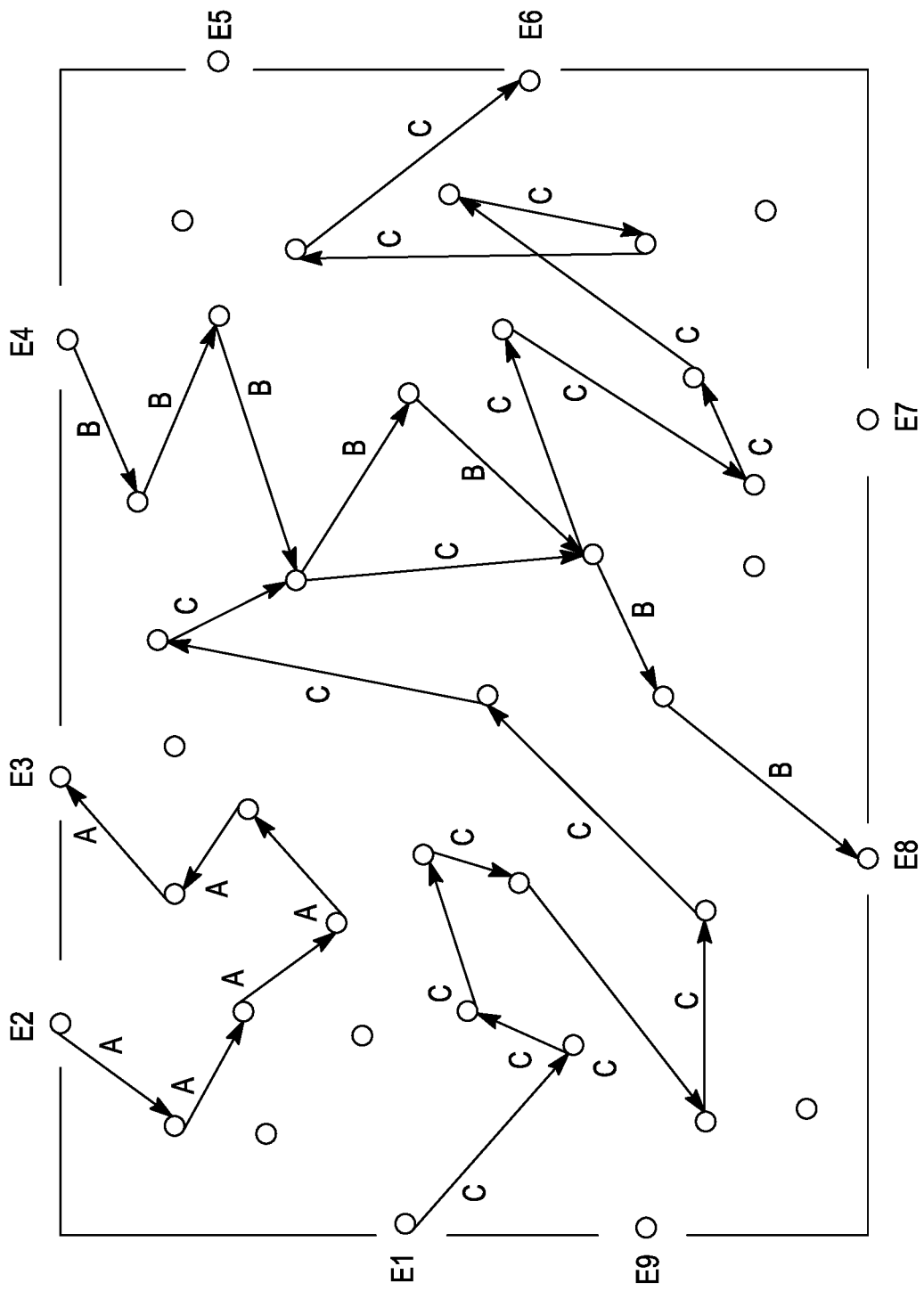
FIG. 7 describes the general problem of complex journeys.

For example, consider FIG. 7 in which a shopping mall has 9 entrances and exits labeled E1 through E9. Assume that the geographical space of the mall contains many sensors and smart devices. User devices may have many possible journeys in the space of the mall. Assume the dots shown in FIG. 7 represent moments that have occurred in the past (over some time period, say one day) for a user device. That is, FIG. 7 is a record of all the moments that happened in the mall over some past time period for a given user device.

The arrows labeled "A" show one possible journey of the user device. The length of this journey is 6. The arrows labeled "B" show a journey of length 7 for the user device. Finally, the arrows labeled "C" show a journey that is 14 moments long. If we now consider many user devices, we will get many journeys of type "A", "B", etc.

We now consider the problem of finding the magic moments for journeys in such situations. The idea is to create zones of an area such as a shopping mall based on various criteria and then coalescing the journeys within a zone to a smaller number of journeys.

Figure 8:
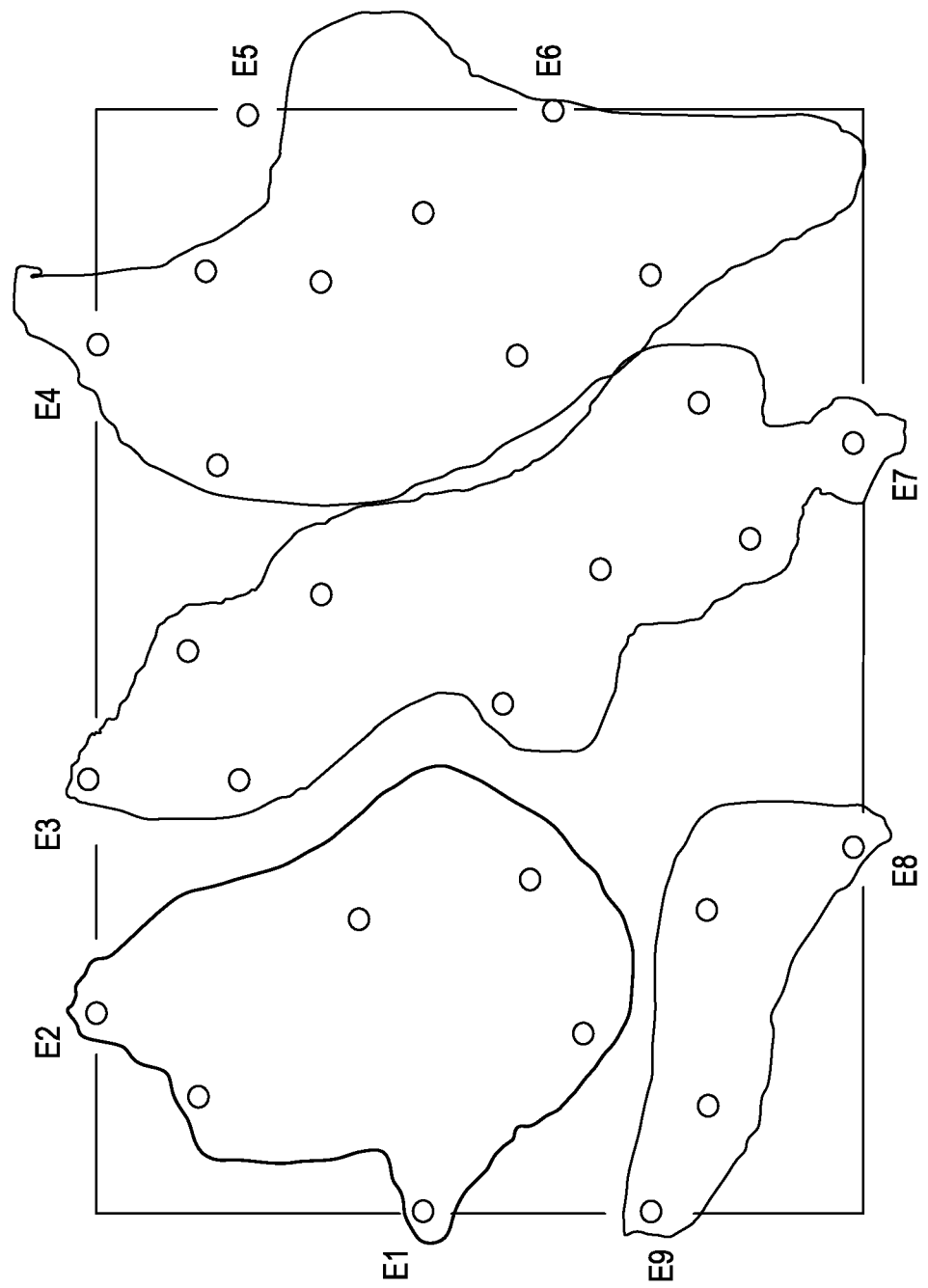
FIG. 8 shows an example of clustering.
Figure 9:
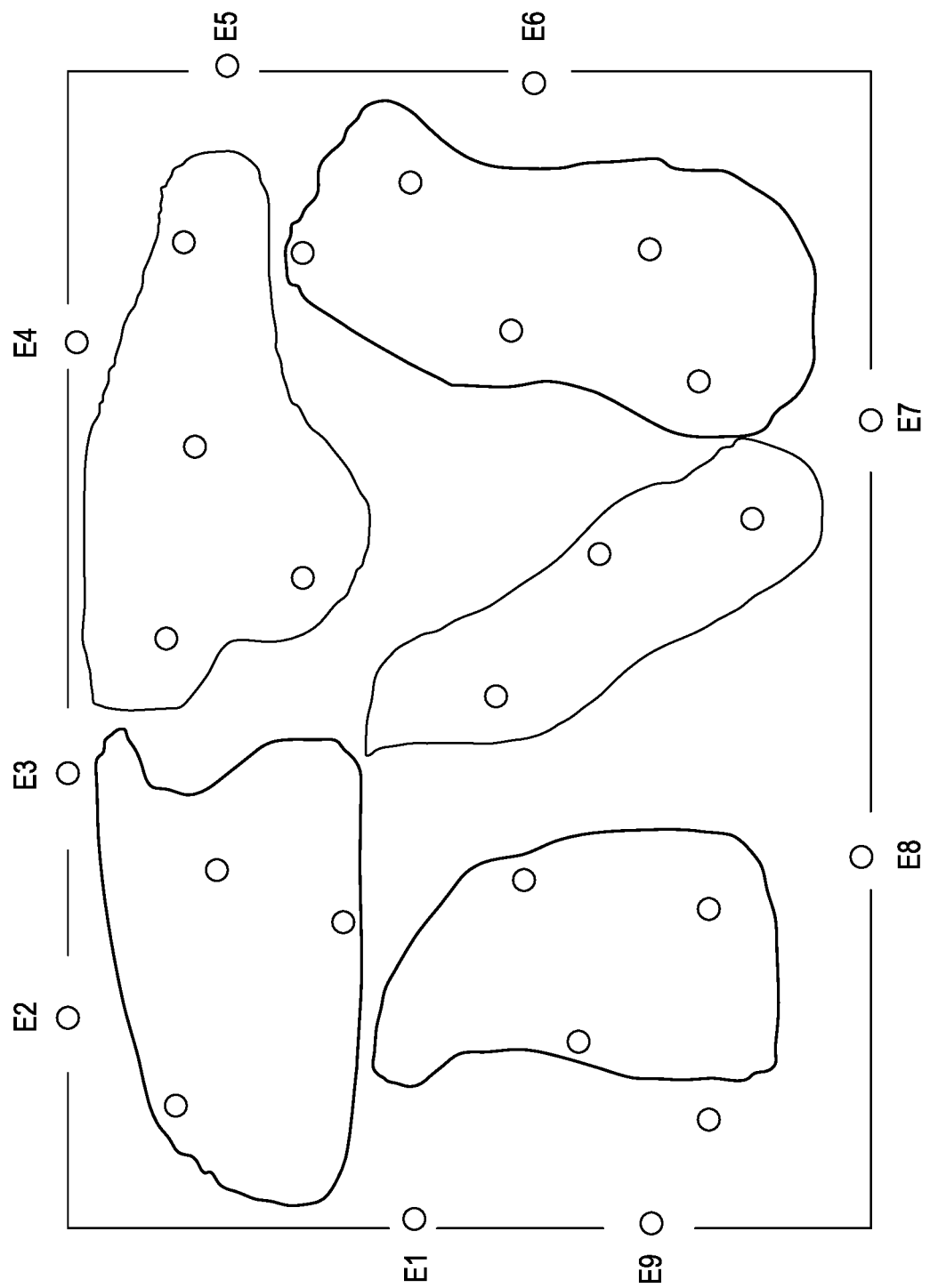
FIG. 9 shows a different clustering technique.

For example, FIG. 8 shows the above shopping mall in which the area has been grouped into 4 zones. FIG. 9 is another example of zoning that has 5 zones and in which the opportunities at the exits and entrances have been excluded from the zones. We will use the word "cluster" to refer to a zone and the methods used to create clusters will be called "clustering methods".

Figure 10:
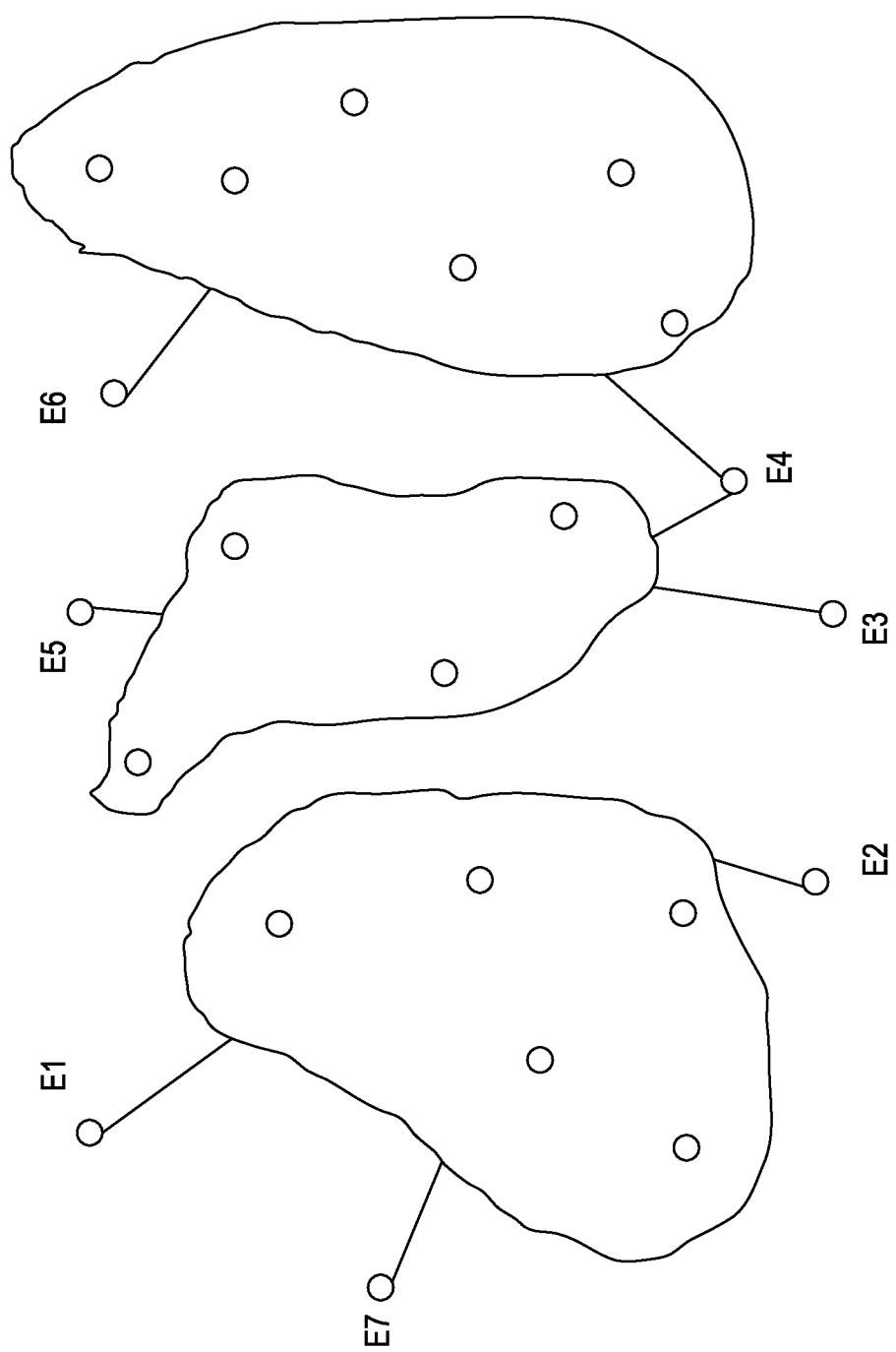
FIG. 10 shows a decomposition of a complex journey into one with lesser number of moments.

As mentioned above, we may use any number of criteria to create clusters. FIG. 10 is based on a clustering method that favors closely situated opportunities. Given an opportunity, sometimes called the "seed", gather nearest-neighbor opportunities (nearest in time or location, etc.) into the seed's cluster. If the cluster exceeds a certain critical size (in number of moments) then no new opportunities may be added to said cluster. As above, the term "nearest" refers to the "distance" between two points in an n-dimensional space.

We now describe an exemplary clustering method.

Clustering Method.

For a designated amount of time, say one week, record all moments in the journeys of a user device.

Form clusters of moments based on one parameter, e.g., "location" using nearest neighbor heuristic. Thus, in this case, clusters correspond to physical areas that saw the most moments.

Connect exit/entry or leftover moments, if any.

Repeat the above step for other parameters as needed.

It is important to understand the impact of the above procedure. Effectively, the procedure aggregates several moments into a single moment, thereby reducing multiple journeys into a few or a single journey. Equivalently, the journeys have a smaller number of moments and their lengths may be arbitrarily fixed, i.e., we may assume that all journeys have a fixed number of moments. FIG. 10 shows an example of clustering the journeys of FIG. 7. Since the clustered journeys have a fixed number of moments, we may apply the "magic moment" procedure described above.

User Preferences

The embodiment discussed so far has mostly concentrated on sensor data being used to determine states of user devices. We now turn our attention to user preferences.

As an example, consider a user (carrying a user device) in an environment where a smart device renders music. The smart device is so configured as to render music that is of a liking to users in the environment, e.g., a retail store with ambient music service. Thus, the user gets to experience a user-friendly environment. In order to determine the user's musical preferences, the user is willing to share names of composers but not the actual music pieces that he may have played or purchased, etc. In particular, the user's data is to be treated as private but certain designated properties may be revealed, e.g., the user is willing to respond to probes of the form "Do you like Chopin", his responses being binary "true/false".

In order to play his music, the user utilizes a particular app, that records the music played by the user. Many conventional apps save playlists of music pieces played or specified by users.

It is then possible for said music app to organize a user's playlist into a frequency table as discussed in FIGS. 3A and 3B. And as explained above, a user may be allowed to mark certain bins of the corresponding data to be made sharable or not. Thus, if the histogram for a user shows the frequency with which the user plays Chopin, Mozart, etc., then a probe "(Chopin)" may be sent to the user device and it may elicit a response.

Thus, the user device may be configured to convey the user's musical preferences in a constrained manner. In particular, the user device may respond to probes by RMS 106 of FIG. 2, enabling AE 111 to construct models about the user's musical preferences.

Data from retail purchases and other apps may also be treated similarly.

Thus, the following illustrative embodiments may be considered typical.

A user enters a retail establishment that has a smart music device which is configured to render (ambient) music within the confines of the establishment. The smart device may choose different playlists based on the customers visiting the establishment at any given time. If there is more than one user in the store, the smart music device selects music in a round-robin fashion, one user at a time. The users reveal their musical preferences by composer.

A user and his family is at home. The home contains a smart thermostat that is configured to maintain a temperature that is preferred by the occupants of the house. In case there is more than one occupant, the smart sensor maintains the temperature at the average for all the occupants, i.e., average of their preferred temperatures. The household members reveal their temperature preferences via their user devices responding to probes of the form "Do you prefer 75° F.", etc., with a true/false response.

An owner of a smart laundry machine wishes to seek bids for his machine when it needs laundry detergent. The user may reveal the city of his location in order to solicit the bids. (Once a bidder has been selected, the actual address of the user may be revealed by an out-of-band process.)

The methods and system of the present invention may now be used to implement the above scenarios.

A user and his family members are at home. Each family member has a preference for the temperature maintained by a smart thermostat device installed in the house. (Conventionally, the household members use their user devices to set the temperature to their liking; the smart thermostat learns a user's preferred temperature over time.)

The thermostat conveys the current temperature to the various user devices in the house at any given moment. Special logic (Aggregator 105 FIG. 1) in the respective user devices organizes the received temperature data into histograms as discussed above. A server (RMS 106, FIG. 2) in connection with the user devices probes the user devices for preferred temperatures. (The probes relate to the temperature bins such as [65-68° F.], [69-72° F.], etc.) By making repeated probes to the various user devices, a server (AE 111, FIG. 2) is able to construct the distribution of preferred temperatures according to the occupants of the house (provided no household member has prevented probes by unmarking one or more of his bins) and thus is able to communicate the average temperature to the smart thermostat device.

A smart laundry machine, using its sensors, detects that it needs a refill of detergent. Its service logic is programmed to solicit bids and choose the lowest cost bid. The laundry sensor in the laundry machine generates a "detergent needed" message that is transmitted to the user device of the owner of the machine. (Alternatively, a device of the manufacturer of the machine may be notified.) The message is communicated to a specific app in the user device that sends the message to Aggregator 105, FIG. 1, where it is processed and stored in tables probed by RMS 106, FIG. 2. (Alternatively, said app may use an out-of-band process to send an alert to AE 111 (FIG. 2) that then requests RMS 106 to probe the user device.) The probe to the user device queries the city where the laundry machine is located. Once the city of location is ascertained, AE 111 may provide the location information to prospective (automatic) bidding agents, i.e., computer programs or a real-time broker system. Once the solicited bids are received, the bids may be sent to an app on the user device as a network service where they may be processed to choose the lowest bid.

Figure 11:
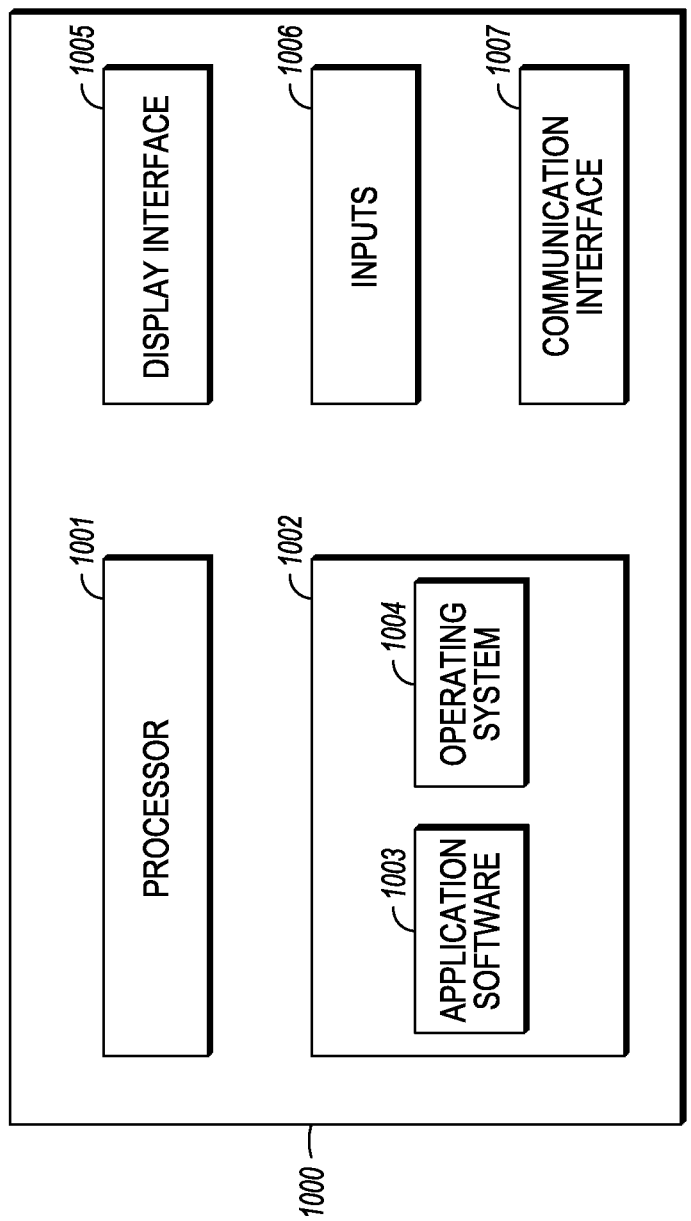
FIG. 11 shows an illustrative computing environment.

FIG. 11 illustrates various components of an illustrative computing-based device 400 which may be implemented as any form of a computing and/or electronic device, and in which embodiments of various aspects of the present invention as described above may be implemented.

The terms "module," "program," "engine" and "component" may be used to describe an aspect of computing-based device 400 that is implemented to perform one or more particular functions. In some cases, such a module, program, engine or component may be instantiated via a logic subsystem executing instructions held by a storage such as a memory. It is to be understood that different modules, programs, and/or components may be instantiated from the same application, service, code block, object, library, routine, API, function, etc. Likewise, the same module, program, engine and/or component may be instantiated by different applications, services, code blocks, objects, routines, APIs, functions, etc. The terms "module," "program," "engine" and "component" are meant to encompass individual or groups of executable files, data files, libraries, drivers, scripts, database records, etc.

The computing-based device 1000 comprises one or more inputs 1006 which are of any suitable type for receiving media content, Internet Protocol (IP) input, activity tags, activity state information, resources or other input. The device also comprises communication interface 1007 to enable the device to communicate with one or more other entity using any suitable communications medium.

Computing-based device 1000 also comprises one or more processors 1001 that may be microprocessors, controllers or any other suitable type of processors for processing computing executable instructions to control the operation of the device in order to provide a search augmentation system. Platform software comprising an operating system 1004 or any other suitable platform software may be provided at the computing-based device to enable application software 403 to be executed on the device.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

The computer executable instructions may be provided using any non-transitory computer-readable media, such as memory 1002. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 1005 is provided to control a display device to be used in conjunction with the computing device. The display system may provide a graphical user interface, or other user interface of any suitable type.

The invention claimed is:

1. A method for delivering at least one service to a user device over one or more communications network, comprising:

sending to a user device one or more queries each requesting a binary response, each query inquiring whether or not the user device has obtained one or more specified parameter values, or range of parameter values, from one or more sensors incorporated in or in communication with the user device;

receiving, for each query a binary response indicating that the user device has or has not obtained the one or more specified parameter values, or the range of parameter values, about which the respective query is inquiring;

defining one or more user device states based on the queries and the binary responses thereto, each of the user device states being a function of the one or more of the specified parameter values, or the range of parameter values, that the user device has indicated as being obtained from the one or more sensors;

selecting a service to be delivered to a designated user device over the one or more communication networks based at least in part on the one or more user device states that have been defined; and delivering the selected service to the designated user device.

2. The method of claim 1, wherein defining the one or more user device states includes defining a plurality of sequential user device states, a first and last of the user device states in the sequence following and preceding, respectively, a dormant device state in which there is no change in one or more specified parameters in the user device states for at least a prescribed amount of time, the plurality of sequential user device states between the dormant device states defining a journey.

3. The method of claim 1, further comprising selecting one of the plurality of sequential user device states in which the user device is to reside when the selected service is delivered.

4. The method of claim 1, wherein the selected one of the sequential user device states is a user device state satisfying a metric indicating that a user of the user device is most likely to be responsive to the selected service when the user device is in the selected one of the sequential user device states.

5. The method of claim 1, wherein selecting the service to be delivered to the designated user device includes selecting a manner in which the selected service is to be delivered to the user device.

6. The method of claim 1, wherein selecting the manner in which the service is to be delivered includes selecting a time and place at which the service is to be delivered to the user device.

7. The method of claim 1, wherein the designated user device is the user device from which the binary responses are received.

8. The method of claim 1, wherein a binary response is not received in response to at least one of the queries that requests one or more specified parameter values, or the range of parameter values, a user of the user device has previously designated as being private.

9. The method of claim 5, wherein selecting the manner in which the selected service is to be delivered to the user device is based at least in part on a model constructed from the binary responses.

10. The method of claim 1, wherein the query interrogates logic residing in the user device that aggregates sensor data from the one or more sensors to generate the parameter values or range of parameter values.

11. The method of claim 1, wherein the designated user device is a user device that, when the selected service is to be delivered, is in a user device state that is within a specified distance in state space of the state in which resides the user device from which the binary responses are received.

12. The method of claim 1, wherein one or more of the queries inquires whether or not a user of the user device has a specified preference, the binary response indicating that the user does or does not have the specified user preference.

13. A system for delivering at least one service to a user device over one or more communications network, comprising:

a response management module configured to send to a user device one or more queries each requesting a binary response, each query inquiring whether or not the user device has obtained one or more specified parameter values, or range of parameter values, from one or more sensors incorporated in or in communication with the user device, the response management module being further configured to receive, for each query a binary response indicating that the user device has or has not obtained the one or more specified parameter values, or the range of parameter values, about which the respective query is inquiring;

an analysis engine configured to define one or more user device states based on the queries and the binary responses thereto, each of the user device states being a function of the one or more of the specified parameter values, or the range of parameter values, that the user device has indicated as being obtained from the one or more sensors, the analysis engine being further configured to select a service to be delivered to a designated user device over the one or more communication networks based at least in part on the one or more user device states that have been defined; and a delivery engine configured to deliver the selected service to the designated user device.

* * * * *